United States Patent
Wu

(10) Patent No.: US 8,861,422 B2
(45) Date of Patent: Oct. 14, 2014

(54) METHOD OF MANAGING MULTIMEDIA BROADCAST MULTICAST SERVICE RECEPTION AND RELATED COMMUNICATION DEVICE

(75) Inventor: Chih-Hsiang Wu, Taoyuan County (TW)

(73) Assignee: HTC Corporation, Taoyuan, Taoyuan County (TW)

(*) Notice: Subject to any disclaimer, the term of this patent is extended or adjusted under 35 U.S.C. 154(b) by 174 days.

(21) Appl. No.: 13/615,406

(22) Filed: Sep. 13, 2012

(65) Prior Publication Data

US 2013/0003635 A1 Jan. 3, 2013

Related U.S. Application Data

(62) Division of application No. 12/822,185, filed on Jun. 24, 2010, now Pat. No. 8,441,976.

(60) Provisional application No. 61/221,094, filed on Jun. 29, 2009.

(51) Int. Cl.
*H04H 20/71* (2008.01)
*H04W 72/00* (2009.01)

(52) U.S. Cl.
CPC .................................. *H04W 72/005* (2013.01)
USPC ........................................ 370/312; 348/14.02

(58) Field of Classification Search
CPC .................................................. H04W 72/005
USPC ................ 370/310–312, 320, 432; 348/14.02
See application file for complete search history.

(56) References Cited

U.S. PATENT DOCUMENTS

| | | | |
|---|---|---|---|
| 2004/0142706 A1 | 7/2004 | Kim | |
| 2005/0249141 A1* | 11/2005 | Lee et al. | 370/312 |
| 2007/0155390 A1* | 7/2007 | Kodikara Patabandi et al. | 455/450 |
| 2008/0192675 A1* | 8/2008 | Kim et al. | 370/320 |
| 2008/0233974 A1 | 9/2008 | Xu | |
| 2009/0023470 A1* | 1/2009 | Fujimoto | 455/552.1 |
| 2009/0149164 A1 | 6/2009 | Cai | |
| 2009/0168922 A1 | 7/2009 | Malladi | |
| 2009/0196204 A1 | 8/2009 | Astely | |

(Continued)

FOREIGN PATENT DOCUMENTS

| | | |
|---|---|---|
| CN | 101064617 A | 10/2007 |
| CN | 101262626 A | 9/2008 |

(Continued)

OTHER PUBLICATIONS

Office action mailed on Aug. 2, 2012 for the China application No. 201010222747.3, filed Jun. 29, 2010, p. 1-10.

(Continued)

*Primary Examiner* — Gary Mui
(74) *Attorney, Agent, or Firm* — Winston Hsu; Scott Margo

(57) ABSTRACT

A method of managing MBMS reception for a communication device in a wireless communication system includes the step of performing discontinuous reception with off durations and receiving data of a MBMS subframe when the communication device has subscribed a MBMS service and the MBMS subframe is in one of the off durations.

6 Claims, 6 Drawing Sheets

(56) References Cited

U.S. PATENT DOCUMENTS

| | | | |
|---|---|---|---|
| 2009/0290541 A1 | 11/2009 | Nishio | |
| 2009/0318149 A1 | 12/2009 | Xing | |
| 2010/0080160 A1 | 4/2010 | Kazmi | |
| 2010/0255859 A1* | 10/2010 | Park et al. | 455/458 |
| 2010/0284319 A1 | 11/2010 | Wang | |
| 2010/0309836 A1* | 12/2010 | Sugawara et al. | 370/312 |
| 2010/0317283 A1 | 12/2010 | Wu | |
| 2010/0329171 A1 | 12/2010 | Kuo | |
| 2011/0019604 A1* | 1/2011 | Chun et al. | 370/312 |
| 2011/0019648 A1* | 1/2011 | Huang et al. | 370/332 |
| 2011/0170472 A1 | 7/2011 | Noh | |
| 2011/0275363 A1 | 11/2011 | Kwon | |
| 2012/0044826 A1 | 2/2012 | Wang | |
| 2012/0051306 A1 | 3/2012 | Chung | |

FOREIGN PATENT DOCUMENTS

| | | |
|---|---|---|
| EP | 1 435 751 A1 | 7/2004 |
| EP | 1 940 060 A1 | 7/2008 |
| WO | 2004028174 A1 | 4/2004 |
| WO | 2005009070 A1 | 1/2005 |
| WO | 2007037657 A2 | 4/2007 |
| WO | 2009022823 A2 | 2/2009 |

OTHER PUBLICATIONS

3GPP R2-093831, "E-mail discussion on eMBMS control plane details (66#19)", Jul. 3, 2009.

3GPP TS 36.211 V8.7.0 (May 2009) 3rd Generation Partnership Project; Technical Specification Group Radio Access Network; Evolved Universal Terrestrial Radio Access (E-UTRA); Physical Channels and Modulation (Release 8).

3GPP TS 36.300 V9.0.0 (Jun. 2009) 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 9).

3GPP TS 36.321 V8.6.0 (Jun. 2009) 3rd Generation Partnership Project; Technical Specification Group Radio Access Network; Evolved Universal Terrestrial Radio Access (E-UTRA) Medium Access Control (MAC) protocol specification (Release 8).

3GPP TS 36.331 V8.5.0 (Mar. 2009) 3rd Generation Partnership Project; Technical Specification Group Radio Access Network; Evolved Universal Terrestrial Radio Access (E-UTRA) Radio Resource Control (RRC); Protocol specification (Release 8).

Office action mailed on Aug. 13, 2012 for the U.S. Appl. No. 12/822,185, filed Jun. 24, 2010, p. 1-24.

Office action mailed on May 14, 2013 for the Taiwan application No. 099121389, filing date Jun. 29, 2010, p. 1-7.

* cited by examiner

METHOD OF MANAGING MULTIMEDIA BROADCAST MULTICAST SERVICE RECEPTION AND RELATED COMMUNICATION DEVICE

CROSS REFERENCE TO RELATED APPLICATIONS

This is a divisional application of U.S. application Ser. No. 12/822,185, which claims the benefit of U.S. Provisional Application No. 61/221,094, filed on Jun. 29, 2009 and entitled "Methods for receiving non-MBMS data and MBMS data in wireless communications system".

BACKGROUND OF THE INVENTION

1. Field of the Invention

A method used in a wireless communication system and related communication device are provided, and more particularly to, a method of managing multimedia broadcast multicast service (MBMS) reception in a wireless communication system and related device.

2. Description of the Prior Art

A long-term evolution (LTE) system, initiated by the third generation partnership project (3GPP), is now being regarded as a new radio interface and radio network architecture that provides a high data rate, low latency, packet optimization, and improved system capacity and coverage. In the LTE system, an evolved universal terrestrial radio access network (E-UTRAN) includes a plurality of evolved Node-Bs (eNBs) and communicates with a plurality of mobile stations, also referred as user equipments (UEs).

Over past few years, a multimedia broadcast multicast service (MBMS) has been introduced in LTE specification. MBMS gives the opportunity to broadcast TV, film, information such as free overnight transmission of newspaper in digital form and other media in these networks. The broadcast capability enables to reach unlimited number of users with constant network load. Further, it also enables the possibility to broadcast information simultaneously to many cellular subscribers.

Two important scenarios have identified for MBMS. One is single-cell broadcast, and the second is MBMS Single frequency network (MBSFN). MBSFN is envisaged for delivering services such as Mobile TV, using the LTE infrastructure. In MBSFN the transmission happens from a time-synchronized set of eNBs, using the same resource block. The MBSFN transmission takes place on dedicated subframes referred to as MBSFN subframes, which would be used for other purpose than MBMS. For example, the UE reads a physical downlink control channel (PDCCH) grant on the MBSFN subframes for possible uplink scheduling. Namely, the MBSFN subframes may be used for non-MBMS transmission when the MBSFN subframes are not allocated for MBMS data.

In order to support the UE to receive MBMS data, the eNB provides the UE with information about which MBSFN subframes are used for MBMS control channel (MCCH), which MBSFN subframes are used for Multicast traffic channel (MTCH) and which MBSFN subframes are used for dynamic scheduling information. In addition, the eNB provides resource allocations (e.g. modulation and coding schemes (MCSs) and frequencies) for MCCH, MTCH and dynamic scheduling information in broadcast message, for example, system information.

However, when the UE subscribing the MBMS service receives a downlink assignment (DL) indicating the MBSFN subframe on PDCCH, for example dynamic scheduling or persistent scheduling, i.e. SPS, the specification does not specify how the UE should decode the MBSFN subframe. Decoding the MBSFN subframe with information/allocation not matching with what the eNB uses for encoding the MBSFN subframe causes decoding errors.

Apart from that, in the LTE system, a discontinuity reception (DRX) function has been introduced. The DRX function allows the UE to enter a standby mode during off durations (i.e. opportunity for DRX) of DRX cycles and during the off durations, stopping monitoring the PDCCH, so as to reduce power consumption of the UE. However, the MBSFN subframe may be allocated within the off durations. In this situation, the UE is unable to receive any data of the MBSFN subframe. As a result, the MBMS service is interrupted.

SUMMARY OF THE INVENTION

A method of managing multimedia broadcast multicast service (MBMS) reception in a wireless communication system is provided to avoid the aforementioned problems.

A method of managing MBMS reception for a communication device in a wireless communication system includes the step of performing discontinuous reception with off durations and receiving data of a MBMS subframe when the communication device has subscribed a MBMS service and the MBMS subframe is in one of the off durations.

A communication device of a wireless communication system for managing MBMS reception includes means for performing discontinuous reception with off durations, and means for receiving data of a MBMS subframe when the communication device has subscribed a MBMS service and the MBMS subframe is in one of the off durations.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
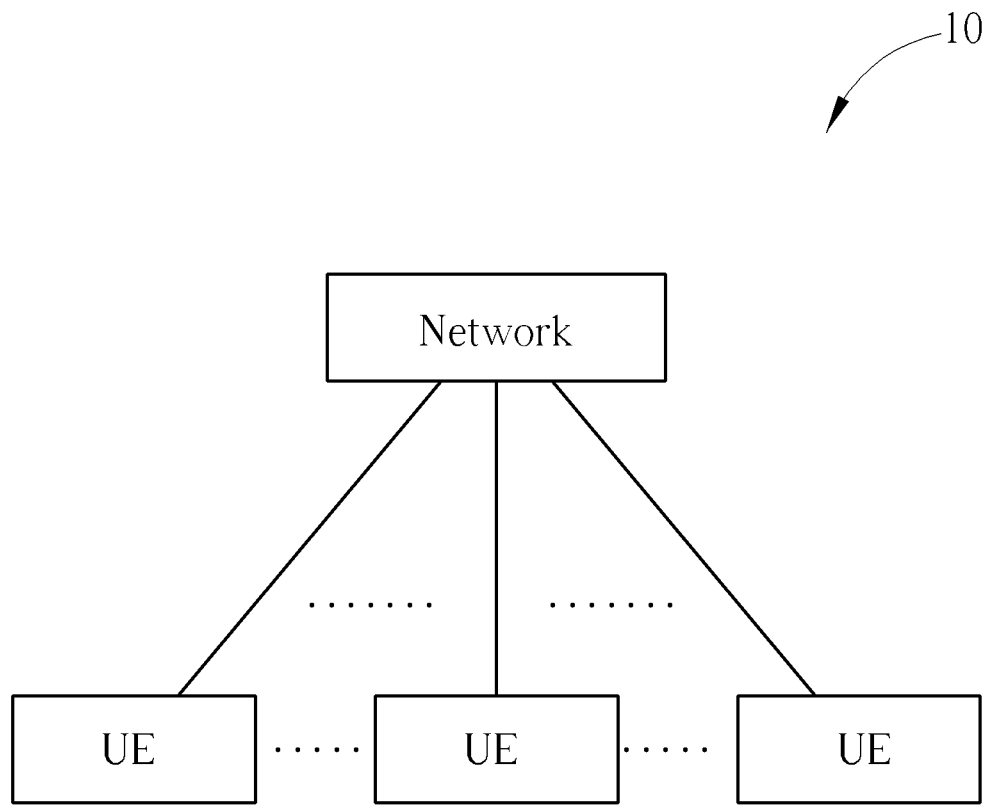
FIG. 1 is a schematic diagram of an exemplary wireless communication system.

Please refer to FIG. 1, which is a schematic diagram of an exemplary wireless communication system 10. The wireless communication system 10, such as an LTE (long-term evolution) system or other mobile communication systems, is briefly composed of a network and a plurality of user equipments (UEs). In FIG. 1, the network and the UEs are simply utilized for illustrating the structure of the wireless communication system 10. Practically, the network comprising a plurality of base stations, such as an E-UTRAN (evolved-UTAN) comprising a plurality of evolved Node-Bs (eNBs) in the LTE system. The UEs can be devices such as mobile phones, computer systems, etc. Besides, the network and the UE can be seen as a transmitter or receiver according to transmission direction, e.g., for uplink (UL), the UE is the transmitter and the network is the receiver, and for downlink (DL), the network is the transmitter and the UE is the receiver.

Figure 2:
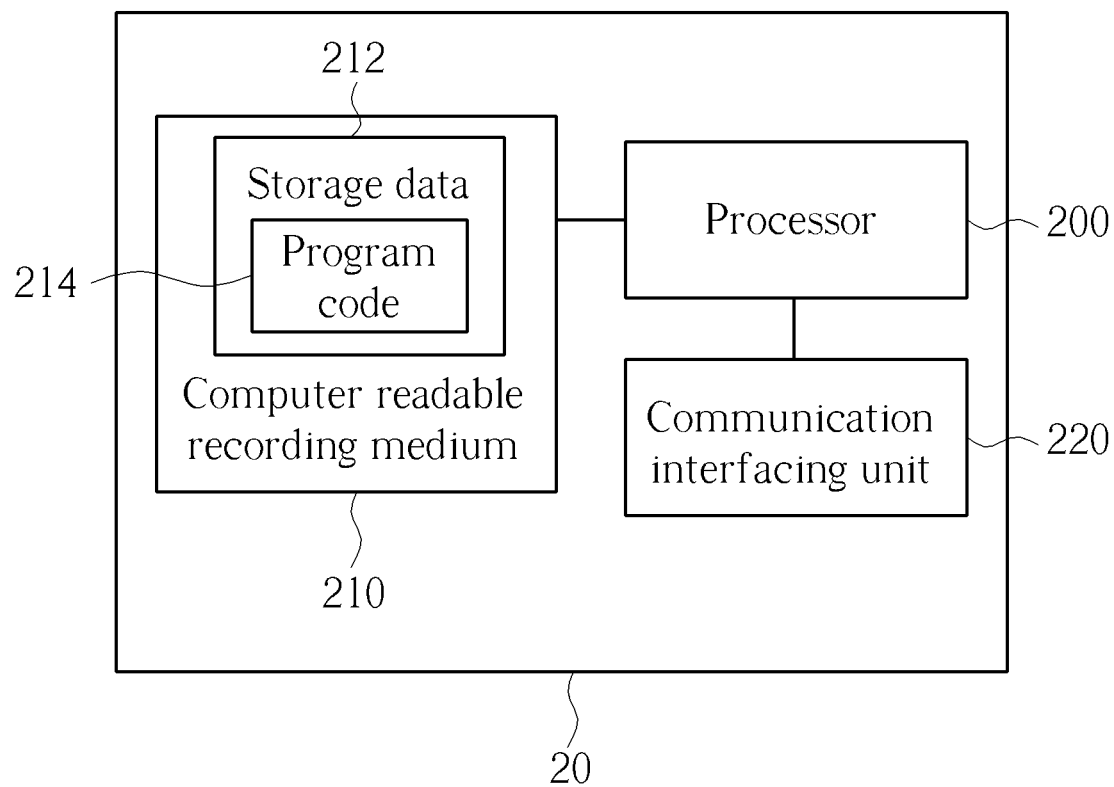
FIG. 2 is a schematic diagram of an exemplary communication device.

Please refer to FIG. 2, which is a schematic diagram of an exemplary communication device 20. The communication device 20 can be the UE or the network shown in FIG. 1 and includes a processor 200, a computer readable recording medium 210 and a communication interfacing unit 220. The computer readable recording medium 210 may be any data storage device that stores storage data 212, including program code 214, thereafter read and processed by the processor 200. Examples of the computer readable recording medium 210 include a subscriber identity module (SIM), read-only memory (ROM), random-access memory (RAM), CD-ROMs, magnetic tapes, hard disks, optical data storage devices, and carrier waves (such as data transmission through the Internet). The communication interfacing unit 220 is preferably a radio transceiver for wirelessly communicating with other communication devices and can transform process results from the processor 200 into radio signals.

Figure 3:
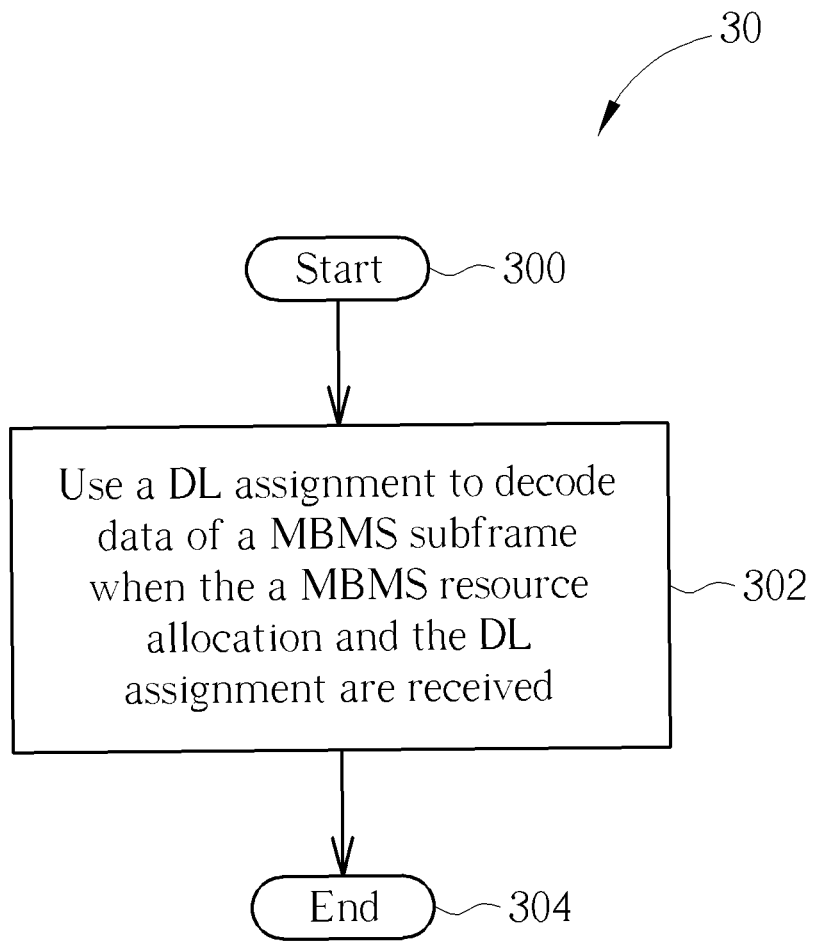
FIG. 3 is a flow chart of an exemplary process.

Please refer to FIG. 3, which is a flow chart of an exemplary process 30. The process 30 is used for managing multimedia broadcast multicast service (MBMS) reception for a UE in a wireless communication system. The process 30 can be compiled into the program code 214 and include the following steps:

Step 300: Start.

Step 302: Use a DL assignment to decode data of a MBMS subframe when a MBMS resource allocation and the DL assignment are received.

Step 304: End.

According to the process 30, the DL assignment is used to decode the data of the MBMS subframe when the UE having received the MBMS resource allocation receives the DL assignment. The DL assignment is dedicated to the UE, and used for the MBMS subframe. In this situation, the UE can receive the DL assignment on a physical downlink control channel (PDCCH) and determine the DL assignment has a higher priority than the MBMS resource allocation. On the other hand, the network may dynamically allocate non-MBMS data (e.g. uni-cast data) to the MBMS subframe if no MBMS data is transmitted in the MBMS subframe.

To receive the MBMS resource allocation, the UE preferably subscribes MBMS, or any service which may allocate MBMS resource allocation to the UE. The data of the MBMS subframe could be multicast traffic channel (MTCH) data, MBMS control channel (MCCH) data or dynamic scheduling data, transmitted by the network in the MBMS subframe, so-called multimedia broadcast single frequency network (MBSFN) subframe. The MBMS resource allocation is received by broadcasting, such as from a broadcast message or system information of a cell broadcasted by the base station, and may include a modulation coding scheme (MCS) and serving frequencies (i.e. sub-carriers) for MCCH, MTCH and dynamic scheduling information in a broadcast message (e.g. system information). Thus, when the UE receives two sets of decoding configuration for the same MBSFN subframe (the DL assignment and the MBMS resource allocation), the UE uses the DL assignment to perform decoding of non-MBMS data when there is MBMS data for transmission in the MBMS subframe.

Figure 4:
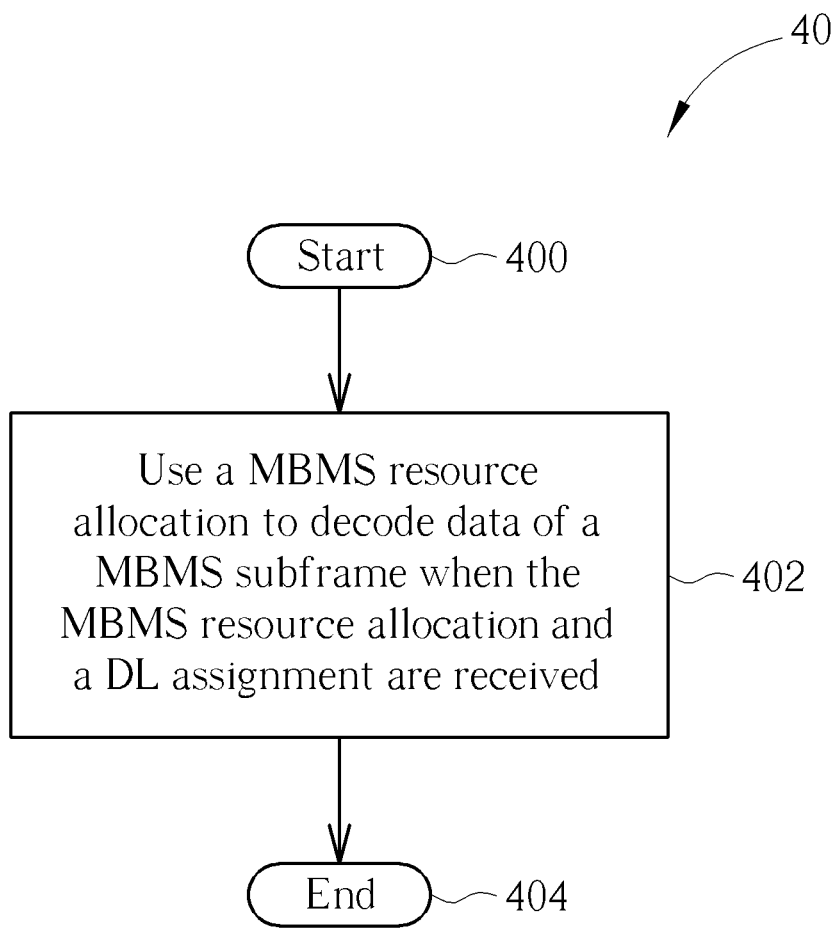
FIG. 4 is a flow chart of an exemplary process.

Please refer to FIG. 4, which is a flow chart of an exemplary process 40. The process 40 is used for managing MBMS reception for a UE in a wireless communication system. The process 40 can be compiled into the program code 214 and include the following steps:

Step 400: Start.

Step 402: Use a MBMS resource allocation to decode data of a MBMS subframe when the MBMS resource allocation and a DL assignment are received.

Step 404: End.

According to the process 40, the MBMS resource allocation is used to decode the data of the MBMS subframe (e.g. MBSFN subframe) when the UE having received the MBMS resource allocation receives the DL assignment. The DL assignment is transmitted on the PDCCH by the network. The UE can further ignore or discard the DL assignment. Thus, the MBMS subframe can be decoded through MBMS resource allocation assigned by the network.

Figure 5:
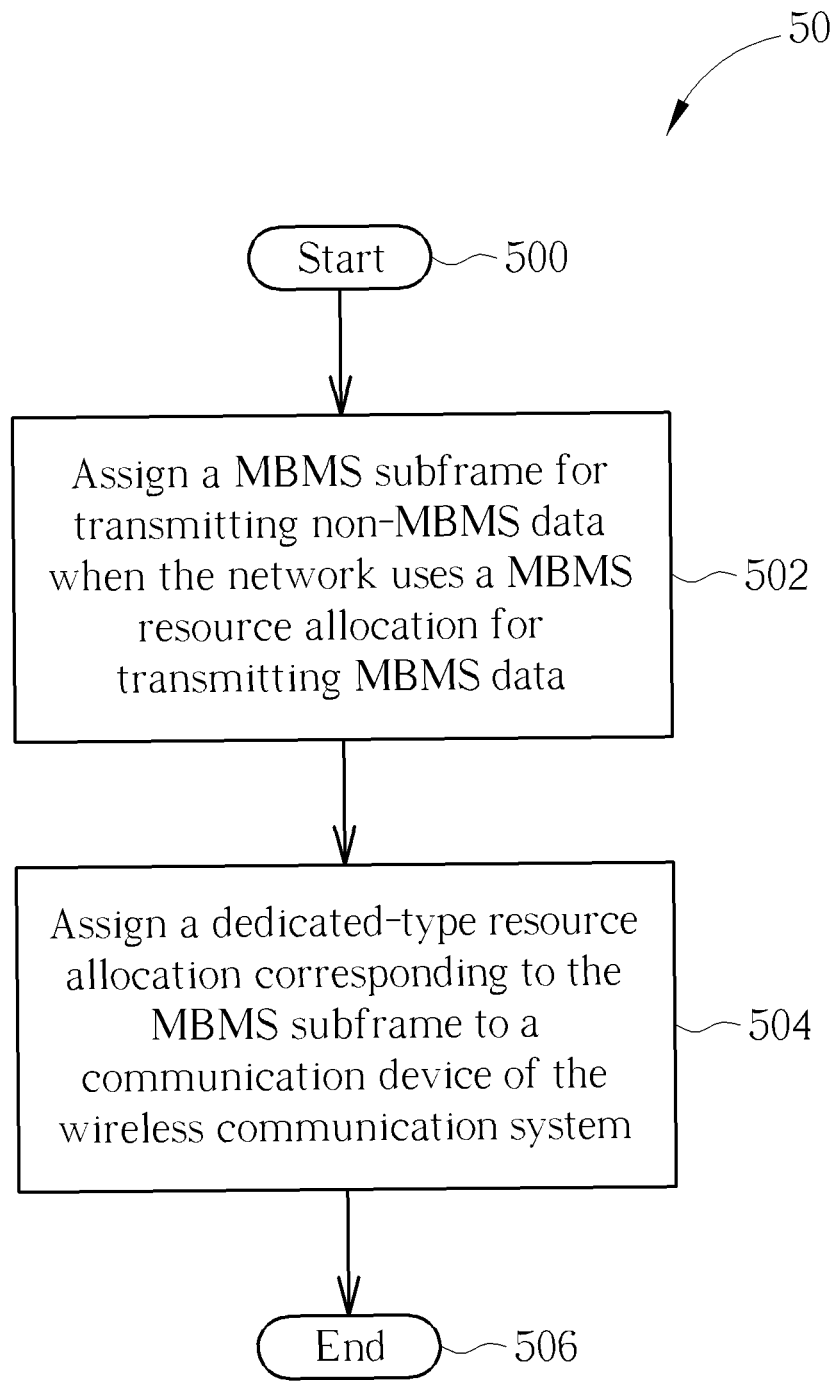
FIG. 5 is a flow chart of an exemplary process.

Please refer to FIG. 5, which is a flow chart of an exemplary process 50. The process 50 is used for managing MBMS transmission for a network in a wireless communication system. The process 50 can be compiled into the program code 214 and include the following steps:

Step 500: Start.

Step 502: Assign a MBMS subframe for transmitting non-MBMS data when the network uses a MBMS resource allocation for transmitting MBMS data.

Step 504: Assign a dedicated-type resource allocation corresponding to the MBMS subframe to a communication device of the wireless communication system.

Step 506: End.

According to the process 50, the network first assigns the MBMS subframe to transmit non-MBMS data when using the MBMS resource allocation for transmitting MBMS data, e.g. MTCH data, MCCH data or dynamic scheduling information. In the next step, the network can dynamically assign the dedicated-type resource allocation to the communication device (e.g. UE). The dedicated-type resource allocation can be a DL assignment dedicated to the communication device and indicates that the MBMS subframe is assigned to transmit the non-MBMS data. The network can manage which MBMS subframe MBMS data is not needed and thereby transmit non-MBMS on the MBMS subframes that can be indicated to the UE through the resource allocation. This achieves cooperation with the UE for management of the MBMS reception.

Figure 6:
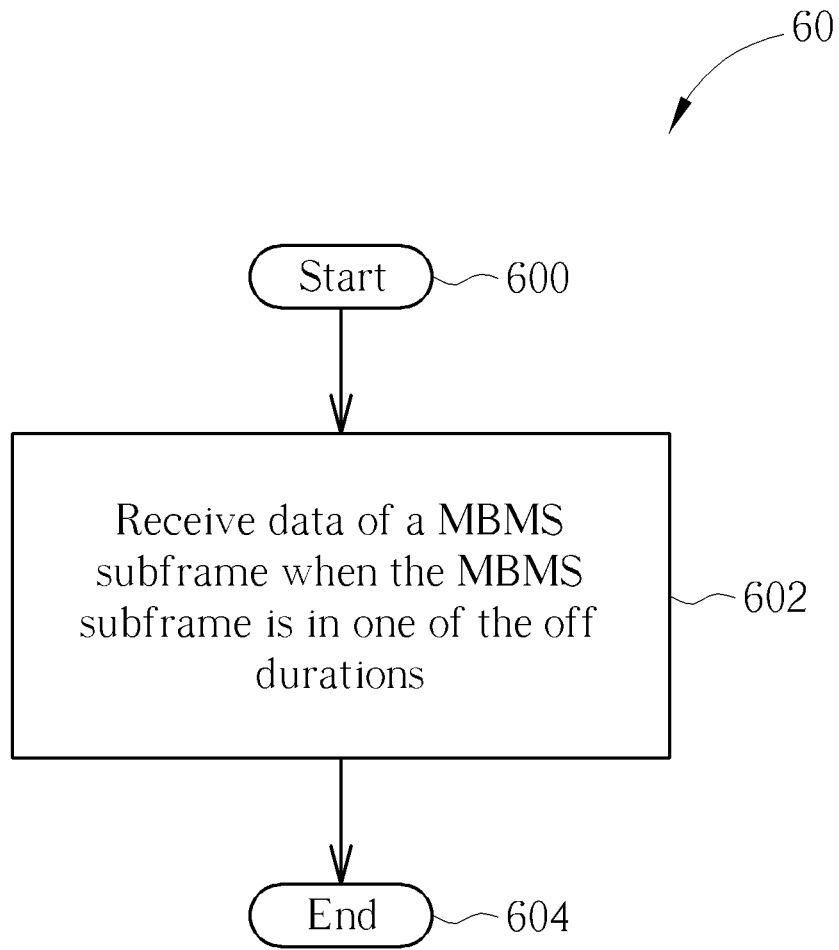
FIG. 6 is a flow chart of an exemplary process.

In the LTE system, a discontinuity reception (DRX) function is applied to a UE to reduce power consumption. The DRX function works with consecutive DRX cycles each including an on duration and an off duration. During the on durations, the UE can receive control signals (e.g. PDCCH signals) from the network. When the UE subscribes MBMS and performs the DRX function, the UE's behavior can be referred to FIG. 6, which is a flow chart of an exemplary process 60. The process 60 is used for managing MBMS reception for the UE in a wireless communication system. The process 60 can be compiled into the program code 214 and include the following steps:

Step 600: Start.

Step 602: Receive data of a MBMS subframe when the MBMS subframe is in one of the off durations.

Step 604: End.

According to the process 60, when the UE has subscribed the MBMS service and the MBMS subframe is in any off duration, the UE wakes up during the MBMS subframe to receive the data of the MBMS subframe to avoid the interruption of the MBMS service. In other words, during off durations except the MBMS subframe, the UE enters a standby mode in which the control signal reception is deactivated. For resource control in LTE system, the UE could be operated in a radio resource control (RRC) connected mode or in an RRC idle mode, herein.

In addition, when the UE wakes up, the UE can leave the off duration and turns on a receiver to receive the data of the MBMS subframe. As for the UE which does not subscribe any MBMS service, deactivation of the MBMS reception is remained during the MBMS subframe. In other words, the UE does not wake up if the UE does not subscribe the MBMS service. This can prevent the particular UEs from power consumption due to awakening.

Please note that the abovementioned steps including suggested steps can be realized by means that could be hardware, firmware known as a combination of a hardware device and computer instructions and data that reside as read-only software on the hardware device, or an electronic system. Examples of hardware can include analog, digital and mixed circuits known as microcircuit, microchip, or silicon chip. Examples of the electronic system can include system on chip (SOC), system in package (Sip), computer on module (COM), and the communication device 20 in which the processor 200 processes the program code 214 related to the abovementioned processes and the processed results can transfer the communication device 20 to a state of successfully decoding the MBMS subframe that may carry non-MBMS data and successfully receiving MBMS subframe data in the off durations.

To sum up, the above-mentioned examples specify the dedicated resource allocation for the UE to decode received data of the MBMS subframe when the UE receives the downlink assignment on the PDCCH. This makes the use of the MBMS subframe more flexible. Correspondingly, the network assigns the downlink assignment for the MBMS subframe to transmit non-MBMS data when the network uses the MBMS resource allocation for transmitting MBMS data or dynamic scheduling information. In addition, the examples also specify the UE behavior, by which the UE wakes up for reception of the MBMS data during the off duration of the DRX cycle. This, thus, avoids the MBMS interruption.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of managing multimedia broadcast multicast service (MBMS) reception for a communication device in a wireless communication system, the method comprising the step of:
    performing discontinuous reception (DRX) with consecutive DRX cycles including off durations; and
    waking up to receive data of a MBMS subframe when the communication device has subscribed a MBMS service and the MBMS subframe is in one of the off durations; and
    deactivating reception of control signal except the MBMS subframe during the one of the off durations;
    wherein each of the consecutive DRX cycles comprises one on duration and one off duration.

2. The method of claim 1 further comprising remaining deactivation of MBMS reception during the MBMS subframe when the communication device does not subscribe any MBMS service.

3. The method of claim 2, wherein the communication device is operated in a radio resource control (RRC) connected mode or an RRC idle mode.

4. A communication device of a wireless communication system for managing multimedia broadcast multicast service (MBMS) reception, the communication device comprising:
    a processor;
    a storage unit; and
    a program code, stored in the storage unit, wherein the program code instructs the processor to execute the following steps:
    performing discontinuous reception (DRX) with consecutive DRX cycles including off durations; and
    waking up to receive data of a MBMS subframe when the communication device has subscribed a MBMS service and the MBMS subframe is in one of the off durations; and
    deactivating reception of control signal except the MBMS subframe during the one of the off durations;
    wherein each of consecutive DRX cycles comprises one on duration and one off duration.

5. The communication device of claim 4, wherein the program code instructs the processor to further execute the following step:
    remaining deactivation of MBMS reception during the MBMS subframe when the communication device does not subscribe any MBMS service.

6. The communication device of claim 4, wherein the communication device is operated in a radio resource control (RRC) connected mode or an RRC idle mode.

* * * * *